United States Patent [19]

Hunter et al.

[11] Patent Number: 5,076,939

[45] Date of Patent: Dec. 31, 1991

[54] METHOD FOR DETACKIFICATION OF PAINT SPRAY OPERATION WASTES

[75] Inventors: W. Eugene Hunter; Lewis D. Morse, both of Pittsburgh, Pa.

[73] Assignee: Calgon Corporation, Pittsburgh, Pa.

[21] Appl. No.: 694,694

[22] Filed: May 2, 1991

[51] Int. Cl.$^5$ .............................. C02F 1/52; C02F 1/56
[52] U.S. Cl. ...................................... 210/712; 210/716; 210/930; 210/727; 210/734; 210/724; 210/705; 55/85
[58] Field of Search ............... 210/930, 712, 724, 726, 210/727, 725, 728, 733, 734, 716, 703–705; 55/85; 252/175

[56] References Cited

U.S. PATENT DOCUMENTS

| | | | |
|---|---|---|---|
| 3,515,575 | 6/1970 | Arnold et al. | 210/930 |
| 3,956,171 | 5/1976 | Moore, Jr. et al. | 252/313.2 |
| 4,153,548 | 5/1979 | Forney | 210/930 |
| 4,504,395 | 3/1985 | Harpel et al. | 210/712 |
| 4,564,464 | 1/1986 | Harpel et al. | 210/930 |
| 4,637,824 | 1/1987 | Pominuille | 210/725 |
| 4,853,132 | 8/1989 | Merrell et al. | 210/930 |

*Primary Examiner*—Stanley S. Silverman
*Assistant Examiner*—Neil M. McCarthy
*Attorney, Agent, or Firm*—Raymond M. Speer; Hesna J. Pfeiffer

[57] ABSTRACT

A novel method of treating circulating water containing over-sprayed water-based or solvent-based paint, such as in a paint spray booth operation, comprises adjusting the alkalinity of the paint spray booth water by adding an alkalinity source thereto, contacting the oversprayed paint with the alkalinity-adjusted water and with an alumina coated silica sol added to the water, adding an effective amount of a polymer floccing agent to the water, and removing resulting sludge from the water.

15 Claims, No Drawings

METHOD FOR DETACKIFICATION OF PAINT SPRAY OPERATION WASTES

FIELD OF THE INVENTION

The present invention relates to methods of treating circulating water containing over-sprayed, water-borne or solvent-borne paint, for example, circulating water in a wet paint spray booth operation.

BACKGROUND OF THE INVENTION

Automobile bodies and many industrial and consumer articles are conventionally spray painted in areas called spray booths, wherein water curtains are employed to cleanse the air of over-sprayed paint. The wash water is then treated to remove paint solids, and the treated water is recirculated.

A water curtain is typically created by pumping water into a trough above the overspray area. The overflow from the trough is controlled so that a uniform sheet of water falls along the length of the trough and down the booth's wall. Spray nozzles are also commonly used. Fine droplets of over sprayed paint, emitted by a spray gun, contact and are captured by the water curtain. The amount of paint contacting a water curtain may change depending on a number of variables, including plant or process shutdowns, the size and shape of the object being painted, the type of spray equipment used, the spraying and purge technique used, and the water flow and the type of paint used.

"Paint," as used herein, is a generic term which encompasses all common varieties of both water-based and solvent-based paints. Solvent-based paints have commonly been employed in spray booths, but in response to federal regulations limiting the amount of volatile hydrocarbons, namely the solvent diluent used in solvent-based paint, that can be emitted from a plant site, water-based paint is now also being used in spray booth operations.

The term "water-based paints," as used herein, refers to all varieties of coatings which contain in excess of approximately 10% water in the coating formulation, including, but not limited to, water-reducible alkyl and epoxy ester compositions, water-borne thermoplastic latex compositions using acrylic polymer/copolymers, water-based latexes of polyurethane dispersions, and blends of such compositions. As used herein, the terms "water-based paints" and "water-borne paints" are synonymous.

The term "solvent-based paints," as used herein refers to all common varieties of water insoluble coatings including but not limited to oil base paints, enamels and lacquers. As used herein, the terms "solvent-based paints" and "solvent-borne paints" are synonymous.

A primary treatment objective relative to both water-based and solvent-based paints is to capture and collect finely dispersed paint solids. A major problem associated with spraying operations concerns the tacky or adhesive nature of the over-sprayed coating materials. Solids tend to agglomerate and accumulate on the walls, ceiling and floor of the spray area and to clog water spray equipment, recirculating pumps and the like. Paint that sticks to spray booth surfaces usually cannot be easily removed from the equipment and tends to build up over time, which hampers spray booth efficiency. Thus, the overspray, or paint mist, captured in the water system of a spray booth must be detackified, or "killed," before it adheres to the walls, piping, etc., of the spray booth. The term "paint killing" as used herein refers to the act of detackifying oversprayed paint in paint spray booths.

Other problems which severely interfere with spray booth operations occur in areas of high agitation where foaming occurs and in areas where foam accumulates. Foaming is caused by chemical additives, surfactants, solvents or combinations thereof. Finely dispersed paint solids which are not captured and removed tend to stabilize foam, which aggravates foaming problems. Foaming generally mandates that copious amounts of defoamers be used, which results in higher operating costs. Water-based paints generally tend to cause foaming to a greater extent than solvent-based paints.

A wide variety of chemicals have been proposed as treating agents for circulating wet spray booth waters containing overspray paint, including compositions containing polymers and amphoteric metal salts which form insoluble hydroxides at pH's greater than about 7. The use of combinations of this type are described in the following U.S. Pat. Nos.: 3,861,887 to Forney; 3,990,896 to Gabel et al.; 4,002,490 to Michalski et al.; 4,130,674 to Roberts et al.; and 4,440,647 to Puchalski. Further, U.S. Pat. No. 4,637,824 to Pominville discloses the use of silicates and polydiallyldialkylammonium halides with amphoteric metal salts, and U.S. Pat. No. 4,853,132 to Merrell et al. discloses the use of precipitates formed by the reaction of cationic polymers and salts of inorganic anions to detackify solvent-based paints. Bentonite clays, aluminum salts and zinc salts have also been used with cationic polymers.

U.S. Pat. No. 4,656,059 to Mizuno et al. relates to the use of melamine-aldehyde acid colloid solutions for treating paint in wet spray booths, and U.S. Pat. No. 4,629,572 to Leitz et al. relates to the use of urea or amino triazine-aldehyde condensation reaction products in combination with water-swellable clays to treat paint spray booth wastes.

The instant invention represents an alternative to the inventions of the prior art in that an alumina coated silica sol, used in conjunction with aqueous polymer flocculant, can be used to treat circulating paint spray booth waters containing over-sprayed paints.

Methods of preparing alumina coated silica sols are taught by DuPont in the following patents: U.S. Pat. Nos. 3,007,878; 3,719,607; and 3,956,171. These DuPont patents stress the stability of the claimed alumina coated silica sols but do not discuss or claim applications thereof.

SUMMARY OF THE INVENTION

The instant invention relates to the use of alumina coated silica sols in conjunction with specified alkalinity sources and polymeric flocculants, applied within designated operating ranges, which can be used with improved results to treat water that contains water-based or solvent-based paints. Such water, after being treated to capture and collect the oversprayed paint contained therein, is typically recirculated in paint spray booth operations.

More specifically, the present invention relates to a method of treating circulating paint spray booth water containing oversprayed water-based or solvent-based paint to facilitate removal of oversprayed water-based or solvent-based paint from such water. The method comprises first adjusting the alkalinity of the circulating paint spray booth water being treated by adding an alkalinity source thereto; contacting the oversprayed paint with the alkalinity adjusted water and with an effective amount of an alumina coated silica sol also added to the water; adding an effective amount of a flocculant to the alkalinity and alumina coated silica sol-treated and paint-containing water; and removing resulting sludge from the water. The method of the present invention is highly efficient for treating systems containing a wide variety of water-based and solvent-based paints. Additionally, the present method generally produces a low-volume, flocculated, predominantly organic sludge which may be readily disposed of in land fills or by incineration.

These and additional advantages will be more apparent in view of the following detailed description.

DETAILED DESCRIPTION

The present invention relates to a method for treating circulating paint spray booth water containing oversprayed paint to facilitate the removal of the paint from the water being treated. The present method comprises: (I), adjusting the alkalinity of the water in the aqueous system being treated, namely circulating paint spray booth water, to provide a minimum alkalinity of about 20 ppm to a maximum alkalinity of about 600 ppm on a calcium carbonate basis; (II), adding to the water an effective amount of an alumina coated silica sol; (III), contacting the alkalinity-adjusted water with (a) oversprayed water-borne paint before or after an effective amount of the alumina coated silica sol is added to the water, or (b) over-sprayed solvent-borne paint after an effective amount of the alumina coated silica sol is added to the water; (IV), adding a flocculant to the water being treated after the oversprayed paint contacts the alkalinity and alumina coated silica in the water; and (V), removing resulting sludge from the water being treated.

Before over-sprayed paint contacts paint spray booth water, the alkalinity of the water in the paint spray booth system being treated should be adjusted to provide a minimum alkalinity of about 20 ppm (on a calcium carbonate basis) to a maximum alkalinity of about 600 ppm. Preferably, the alkalinity should be maintained between about 50 and about 400 ppm and most preferably between about 100 and 200 ppm. These alkalinity ranges are generally critical. At higher alkalinity dosages, paint solids become increasingly difficult to capture, which decreases separation efficiency. At even higher dosages, the paint solids tend to sink instead of float. If sufficient alkalinity is not present (i.e., below about 20 ppm), the alumina coated silica sol is not as effective in killing the oversprayed paint, resulting in very poor collection efficiency.

Additionally, the pH of the water being treated should be maintained between about 6.0 and about 8.0, preferably between about 6.0 and about 7.5. A pH of at least about 6.0 is desirable in order to activate the alumina coated silica sol. As the pH is lowered below about 6.0, corrosion in the system generally increases. On the other hand, a pH of greater than about 8.0 generally results in greater solids dispersion, thus creating less efficient solids capture, and causes greater foam generation.

Alkalinity can be added in the form of carbonates, for example, alkali metal carbonates and alkali metal bicarbonates such as sodium carbonate or sodium bicarbonate, NaOH, KOH, silicates and/or blends thereof. However, preferred alkalinity sources are alkali metal carbonates and silicates, with sodium carbonate, sodium bicarbonate, and mixtures thereof being especially preferred for treatment of paint spray booth water systems that contact water-based paints. For treatment of paint spray booth water systems that contact solvent-based paints, a mixture of (a) sodium carbonate, sodium bicarbonate, and mixtures thereof plus (b) sodium silicate is especially preferred, with a ratio of (a):(b) of about 2:1 to about 1:2 being preferred, and a ratio of 1:1 being especially preferred. These alkalinity sources are generally inexpensive and safe to use, and they provide excellent flotation to the water-based paint solids when used in combination with polymeric flocculants. Thus, alkalinity, particularly carbonate alkalinity for treatment of paint spray booth water systems that contact water-based paints, and particularly carbonate plus silicate alkalinity for treatment of paint spray booth water systems that contact solvent-based paints, assists in floating the flocculated paint particles to the surface of the water system being treated.

The alkalinity should be adjusted so that the water forming the curtain which contacts the over-sprayed paint or paints is in the designated alkalinity range. Any method of adding the source of alkalinity can be used, including batch or continuous addition, with continuous addition being preferred.

In addition to the alkalinity requirement, an effective amount of the alumina coated silica sol must be added to or maintained in the water being treated. As used herein, the term "effective amount" refers to that amount of alumina coated silica sol which achieves the desired water clarity and paint solids capture after addition of flocculant to the system being treated. As used herein, the alumina coated silica sol is a sol prepared from a) a pre-prepared silica sol such as DuPont's Ludox HS 40, a colloidal silica of 40% concentration, and b) aluminum chloride or c) aluminum chlorohydrate. Methods for preparing alumina coated silica sols are taught by the following patents, all to DuPont: U.S. Pat. No. 3,007,878; U.S. Pat. No. 3,719,607; U.S. Pat. No. 3,956,171. None of the foregoing patents discuss or claim applications for the sols.

The alumina coated silica used in the process of this invention is insoluble in water. It is therefore best utilized in a composition with sufficiently low pH to keep the alumina coated silica in a fine colloidal state of suspension. An alumina coated silica sol with a pH of about 4 to about 6 is preferred.

The alumina coated silica particles of the sol are prepared so that the mole ratio of aluminum to surface $SiO_2$ is from about 1:2 to 2:1, and preferably 1:1. The silica particle size is preferably from 7 to 30 millimicrons.

The precent by weight of alumina coated silica in a stabilized suspension or solution should range from about 5% to about 50%, preferably 20% to about 40%, and most preferably about 25% to about 35%, due to cost and product stability considerations.

The alumina coated silica sol can be applied intermittently or continuously to the water system being treated at a preferred dosage of from between about 0.001 to about 1.0 part alumina coated silica per part paint, most preferably between about 0.01 and about 0.5 part alumina coated silica per part paint. Since paint spraying is generally continuous, continuous addition of the alumina coated silica sol is preferred. The alumina coated silica sol may be added at any convenient location, but is preferably added so as to allow the maximum concentration of alumina coated silica to contact the oversprayed paint. For example, the alumina coated silica sol may be added to a line supplying the trough or other device used to form the water curtain. Multiple points of addition may be used. The alkalinity adjustment and alumina coated silica sol addition steps may be carried out simultaneously when treating a water system that will capture either water-based or solvent-based paints, noting, however, that alkalinity adjustment occurs prior to contact between the oversprayed paint and the circulated paint spray booth water.

A key factor of this invention is that the over-sprayed water-based or solvent-based paint contact the water curtain after the water has been adjusted to the desired alkalinity range. However, the following significant distinction exists between the treatment of water that will contact water-based paint versus solvent-based paint. After the alkalinity of the water is adjusted properly, the alumina coated silica sol can be added to the paint spray booth water before or after addition of water-based paint to the water; either sequence of addition will provide the desired results. In fact, addition of the alumina coated silica sol after the water-based paint contacts the water to be treated often provides improved results. In contrast, for best results with solvent-based paints, after the alkalinity of the water is adjusted properly, the alumina coated silica sol should be added to the water before the oversprayed solvent-based paint is contacted with the water; adding the solvent-based paint to the water before adding the alumina coated silica sol will not provide good detackification results.

In a typical paint spray booth operation, the return water from the booth generally encounters extreme turbulence. This turbulence improves the efficacy of the treatment by promoting intimate contact between the paint and the alumina coated silica.

After oversprayed paint contacts the alkalinity and the alumina coated silica sol in the circulating water, a polymeric flocculant is added to the paint spray booth water system. The flocculant promotes the formation of a buoyant floc structure by binding the killed paint particles and incorporating air into the floc structure. The resulting floating floc facilitates the removal of paint solids from the circulating water system.

According to this invention, it has been found that the type and the molecular weight of the polymeric flocculant used are both important factors. A suitable flocculant comprises at least one nonionic polymer, at least one anionic polymer, at least one cationic polymer, or at least one amphoteric polymer, or a mixture thereof.

For treating water systems that contain water-based paints, nonionic polymeric flocculants are preferred. Generally, flocculants having weight average molecular weights of at least $2 \times 10^6$ are preferred. More preferably, the molecular weight should exceed about $6 \times 10^6$. Examples of flocculants include long chain polyacrylamides and long chain polymethacrylamides. The most preferred flocculants for water-based paints are nonionic polyacrylamides having a weight average molecular weight ranging from about $6 \times 10^6$ to about $20 \times 10^6$. The foregoing nonionic flocculants may be used to treat water containing solvent-based paint.

For treating water systems that contain solvent-based paints, anionic polymeric flocculants are preferred. Preferred anionic flocculants are composed of polymers of 2-methacrylamido-2-methylpropyl-sulfonic acid and salts thereof, and copolymers of (a) acrylic acid and/or methacrylic acid and (b) 2-acrylamido-2-methylpropylsulfonic acid and/or 2-methacrylamido-2-methylpropylsulfonic acid. Hydrolyzed polyacrylamides may also be used. The preferred anionic polyelectrolytes possess a low charge (i.e., less than 2%) and are selected from the group consisting of polyacrylic acids and salts thereof, particularly sodium salts thereof, having a molecular weight ranging from about $2 \times 10^6$ to about $20 \times 10^6$, hydrolyzed polyacrylamides having virtually any degree of hydrolysis and molecular weights ranging from about $2 \times 10^6$ to about $20 \times 10^6$, and polymers comprising (a) acrylic acid or methacrylic acid and (b) 2-acrylamido-2-methylpropylsulfonic acid and/or 2-methacrylamido-2-methylpropylsulfonic acid, wherein the weight ratio of (a):(b) range from about 1:99 to about 99:1, preferably 10:90 to 90:10 and most preferably 75:25, and wherein the molecular weight ranges from about $2 \times 10^6$ to about 20 to $10^6$. The foregoing anionic flocculants may also be used to treat water containing water-based paint.

Typical cationic polyelectrolytes which may be used as flocculants when treating water-based or solvent-based paint overspray in the instant invention include but are not limited to polyamines, polyphosphonium compounds, polysulfonium compounds, quaternary ammonium compounds, polymers of methacryloyloxyethyl trimethyl ammonium methyl sulfate (METAMS), polymers of methacrylamido propyl trimethyl ammonium chloride (MAPTAC), polymers of acryloyloxyethyl trimethyl ammonium chloride (AETAC), polymers of methacryloyloxyethyl trimethyl ammonium chloride (METAC) and polymers prepared from combinations of METAMS, MAPTAC, AETAC and/or METAC with acrylamide and/or methyacrylamide. Representative of quaternary ammonium compounds are diethyldiallyl ammonium and dimethyldiallyl ammonium polymers and salts thereof.

The preferred cationic flocculants are quaternary ammonium polymers such as polydimethyldiallyl ammonium chloride (polyDMDAAC), poly dimethyldiallyl ammonium bromide (polyDMDAAB), poly diethyldiallyl ammonium chloride (polyDEDAAB), or any of the same copolymerized with acrylamide or methacrylamide. The preferred molecular weights for the quaternary ammonium polymers are in excess of about 2,000,000.

The most preferred cationic flocculant is a polymer comprising dimethyl diallyl ammonium chloride and acrylamide, or a homologue thereof, having a weight average molcular weight in excess of about 4,000,000. The ratio of the nonionic moiety (for example, acrylamide or methacrylamide) to the cationic moiety should be greater than about 1:1, on an active weight basis.

Other preferred polymers for use with water-based or solvent-based paints comprise: (a) acrylamide or methacrylamide and (b) METAMS, METAC, MAPTAC or AETAC, wherein the monomer ratio of (a):(b), on an active weight basis, is greater than about 1:1.

Certain high molecular weight polyampholytes can also be used in the instant method to floc detackified water-based or solvent-based paints. Representative examples of suitable polyampholytes include polymers comprising (a) acrylic acid, methacrylic acid, 2-acrylamido-2-methylpropylsulfonic acid or 2-methacrylamido-2-methylpropylsulfonic acid, alone or in combination, and (b) dimethyldiallyl ammonium chloride, dimethyldiallyl ammonium bromide, diethyldiallyl ammonium chloride or diethyldiallyl ammonium bromide, alone or in combination, wherein the weight ratio of component (a) to component (b) ranges from about 90:10 to about 10:90 and wherein the polyampholyte has a molecular weight in excess of about $2 \times 10^6$. The polyampholytes may also contain nonionic moieties such as acrylamide or methacrylamide.

Blends of the above listed nonionic, cationic, anionic and polyampholyte flocculants can be used, alone or in combination with amphoteric metal salts.

An effective amount of the polymeric flocculant should be added. The effective amount depends upon the quantity of alumina coated silica present in the system being treated. Preferably, the effective flocculant dosage will range from about .01 to about 150 parts (active basis) of the polymeric flocculant per part alumina coated silica and more preferably, 0.1 to 20 parts per one part on a flocculant: alumina coated silica sol basis.

The function of the polymeric flocculant is two-fold: it reacts with the alumina coated silica sol treated paint solids to form a large, buoyant, easily-captured floc, and it reduces or totally eliminates foam formation in the system by removing colloidal particulates present in the water.

A requirement of the present invention is that the flocculant be added to the paint spray booth water after the over-sprayed paint is contacted with the alkalinity adjusted paint spray booth water and alumina coated silica sol. Once the alumina coated silica sol-treated paint solids have been contacted with at least one polymeric flocculant, the resulting sludge is removed from the water. This removal may be facilitated by any means known in the art, including, but not limited to, air flotation and filtration.

Other additives commonly used for the treatment of water containing oversprayed paint may be used in conjunction with the instant method. For example, bentonite clays, carbon black, talc, gums starch, dextrin, lime, aluminum oxide, silica solids, and casein among other additives, may be used as additional process aids in conjunction with the primary steps of the instant method. Additives from the class of amphoteric metal salts, including, but not limited to, alum, aluminum chloride, ferric sulfate and ferric chloride, can also be used to enhance the performance of the instant invention.

The following examples are given for the purpose of illustrating the present invention and shall not be construed as being limitations on the scope or spirit of the instant invention. Unless otherwise specified, reference to percentage or parts are by weight.

EXAMPLE 1

Deionized water was added to 247.5 g of Ludox HS 40, DuPont's colloidal silica of 40% concentration, to bring it to 33% concentration (total final weight of 300.0 g). Carbon dioxide was bubbled through the sol, with stirring via magnetic bar, until pH reached 7.0. Sodium bicarbonate (1.53 g) was added with stirring. 100 g of this material was added to 19.5 g of 50% aluminum chlorohydrate solution (AG-34) in a Waring blender at 13 ml/5 minutes. The system was then purged with nitrogen gas to dissipate remaining carbon dioxide. The final product had a pH of 5.6 and was turbid. White particulate matter precipitated out. The supernatant, a clear liquid with a bluish haze, was decanted and remained stable for the month before it was used in some of the following examples. Solids determined via evaporation on a hot plate were 33.1%.

EXAMPLE 2

Deionized water was added to 82.5 g of Ludox HS 40 to bring it to 33% concentration (total final weight of 100 g). Carbon dioxide was bubbled through the sol with stirring via magnetic bar until pH reached 7.0. Sodium bicarbonate (0.51 g) was added with stirring. 12.66 g of this material was added to 19.5 g of 50% aluminum chlorohydrate solution (AG-34) at high speed stirring with a turbine stirrer. The final product had a pH of 4.9 and was slightly turbid. White particulate matter precipitated out. The supernatant, a clear liquid with a bluish haze, was decanted and remained stable for the month before it was used in some of the following examples. Solids determined via evaporation on a hot plate were 32.4%.

EXAMPLE 3

The preparations of Examples 1 and 2 were evaluated via a jar test for paint kill, paint dispersion and capability of forming floc. The jar test consisted of vigorously stirring with a magnetic stirring bar 200 ml of 0.5% aqueous sodium carbonate solution made with cold tap water. Eight drops of "water-borne paint cocktail" were added followed by 0.5 ml of the colloidal sol from Example 1. The paint appeared well dispersed in the rapidly stirring system. Then 1.0 ml N-100 [2% aqueous high molecular weight poly(acrylamide)] was added. Stirring was stopped after a half minute. A floating, fluffy floc separated out leaving clear water with a small amount of suspended fines.

EXAMPLE 4

A jar test was conducted as in Example 3, but the colloidal sol used was from Example 2. The results were the same as for Example 3, but the water was clear with no suspended fines.

EXAMPLE 5

This jar test was conducted with solvent-borne paint. In this case 200 ml of an aqueous solution that contains 0.05% sodium silicate and 0.05% sodium carbonate was used. Then 0.5 ml of the colloidal sol of Example 2 was added, followed by 8 drops of "solvent-borne paint cocktail." The paint appeared to be well dispersed in the rapidly stirring system. Then 1.0 ml 2% aqu. polymer 9200 [copoly(acrylamide, 98.5%/acrylic acid, 1.5%)] was added; stirring was stopped after half a minute. A fluffy, floating floc separated out, leaving clear water. The floc had no tack and a trace of smear.

EXAMPLE 6

This test was run to see what efficacy aluminum chlorohydrate had alone.

A jar test was conducted as in Example 5, but in place of the colloidal sol of Example 2, 0.5 ml of 50% aluminum chlorohydrate was used. There was no dispersion of the paint.

EXAMPLE 7

A jar test was conducted as in Example 6, but 0.25 ml of the aluminum chlorohydrate was used. There was no dispersion of the paint, the floc was sparse and ill-defined. The water was cloudy.

What is claimed is:

1. A method of treating circulating paint spray booth water containing oversprayed, water-borne or solvent-borne paint, comprising:
   (a) adjusting the alkalinity of the water to between about 20 and 600 ppm, on a calcium carbonate basis, by adding a source of alkalinity to the water;
   (b) adding to the water an effective amount of alumina coated silica sol;
   (c) contacting over-sprayed water-borne paint with the water after completing step (a) and before or after completing step (b), or contacting over-sprayed solvent-borne paint with the water after completing step (a) and after completing step (b);
   (d) adding an effective amount of a flocculant to said water after completing steps (a), (b) and (c); and
   (e) removing resulting sludge from said water.

2. The method as defined by claim 1, wherein the alkalinity of the water is adjusted to between about 50 and 400 ppm.

3. The method as defined by claim 1, wherein the pH of said water is maintained in the range of about 6.0 to about 8.0.

4. The method as defined by claim 1, wherein the paint to be contacted with the water is water-borne paint.

5. The method as defined by claim 4, wherein the alkalinity source is selected from the group consisting of carbonates and silicates.

6. The method as defined by claim 5, wherein the alkalinity source is selected from sodium carbonate, sodium bicarbonate and mixtures thereof.

7. The method as defined by claim 4, wherein the flocculant is a poly(acrylamide).

8. The method as defined by claim 4, wherein the alumina coated silica sol is added to the water before the over-sprayed, water-borne paint is contacted with the paint spray booth water.

9. The method as defined by claim 4, wherein the alumina coated silica sol is added to the water after the over-sprayed, water-borne paint is contacted with the paint spray booth water.

10. The method as defined by claim 1, wherein the paint to be contacted with the water is solvent-borne paint.

11. The method as defined by claim 10, wherein the alkalinity source is selected from the group consisting of carbonates and silicates.

12. The method as defined by claim 11, wherein the alkalinity source is selected from (a) sodium carbonate, sodium bicarbonate and mixtures thereof and (b) sodium silicate.

13. The method as defined by claim 12, wherein the ratio of (a):(b) is 1:1.

14. The method as defined by claim 10, wherein the flocculant is a copoly(acrylamide/acrylic acid).

15. The method as defined by claim 10, wherein the alumina coated silica sol is added to the water before the over-sprayed, solvent-borne paint is contacted with the paint spray booth water.

* * * * *